No. 788,101. PATENTED APR. 25, 1905.
A. GROSS.
GAME APPARATUS.
APPLICATION FILED JAN. 16, 1904.
*Fig. 1.*
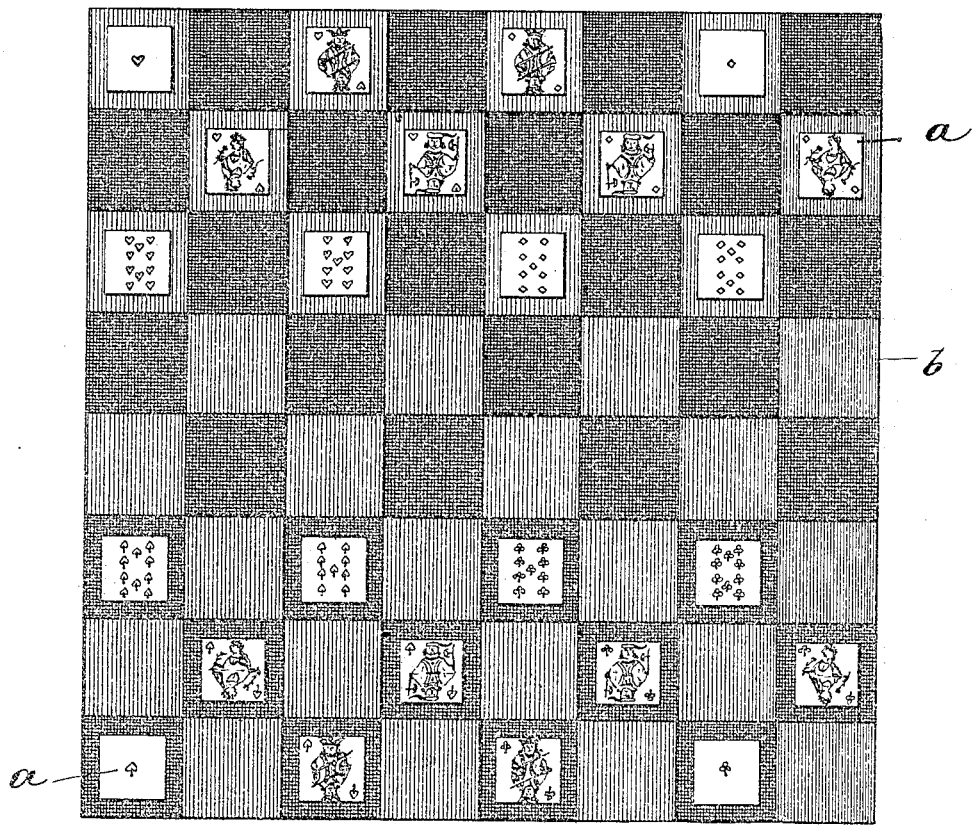
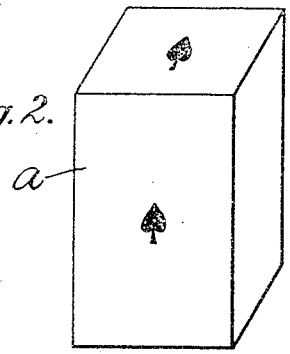
*Fig. 2.*
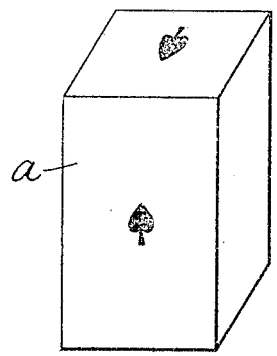
*Fig. 3.*
Witnesses:
Arthur Zumpe.
Frederick Unfricht.
Inventor:
Andrew Gross
by Frank V. Briesen Atty.

No. 788,101. Patented April 25, 1905.

UNITED STATES PATENT OFFICE.

ANDREW GROSS, OF NEW YORK, N. Y.

GAME APPARATUS.

SPECIFICATION forming part of Letters Patent No. 788,101, dated April 25, 1905.

Application filed January 16, 1904. Serial No. 189,256.

*To all whom it may concern:*

Be it known that I, ANDREW GROSS, a citizen of the United States, residing in New York city, (Manhattan,) county and State of New York, have invented a new and useful Improvement in Game Apparatus, of which the following is a specification.

My invention has relation to improvements in games of that class wherein a checkered board is utilized in conjunction with blocks of particular shape or construction, upon certain surfaces of which are delineated representations of playing-cards, as will be hereinafter fully and specifically set forth.

I have fully and clearly illustrated the improvements in the accompanying drawings, to be taken as a part of this specification, and wherein—

Figure 1 is a plan view of a checker-board and the playing-blocks arranged thereon preliminary to beginning the contest. Fig. 2 is a perspective view of one of the blocks with the delineations indicated on the top and side, and Fig. 3 is a perspective view showing the delineations as they appear when the block is turned around on its vertical axis.

The checker-board *b* is a square piece of material of any superficial area as may suit it for the purposes intended and has produced thereon a field of sixty-four squares in alternate colors similar in arrangement to that seen in boards upon which the game of checkers is played.

*a* designates the pieces with which the game is played. Each piece consists of a block of suitable material formed into a rectangular prism, the base and top being of less area than the sides of the block, substantially as seen in Figs. 2 and 3 of the drawings, so that when placed on any square the base will not cover the whole of the square on which it stands and contestants can readily detect the movement of a piece to a square on which it is not entitled to stand. On two opposite faces of each piece or block and on the top face thereof are placed designations portraying a card of a particular kind and value. As illustrated, the values of the pieces run from the ace (the highest) down to a nine-spot (the lowest) in sequence and involve or include the four suits used in a pack of playing-cards. It will be perceived that by making the pieces oblong and indicating the card values on the surfaces facing the contestants and on the upper ends the values of the portrayals are always plainly visible to both and confusion and mistakes not liable to arise during the progress of a game.

Preliminary to the game the board is placed with a "block" corner-square of the first row at the right hand of each player. Then the blocks are placed in positions indicated in Fig. 1 of the drawings—that is, starting with the left-hand corner-square an ace is placed thereon. Then on alternate squares the kings are placed, and then the other ace is stationed on the square next adjacent to the corner. The next or second row of blocks is stationed on alternate squares, with the queens occupying the outer positions and the knaves the inner squares, as shown. Then the blocks with the pip-card representations are placed on alternate squares to the queen row with the ten-spots on the outer squares and their suits intermediate and adjacent thereto, and in this position the players proceed with the game.

To play the game, a selected block of the third row is moved forward onto one of the two diagonally-adjoining squares and continuing this method of movement throughout the play, except when capturing a piece. Either player can capture any adjoining block of the opponent arriving opposite to his block by "jumping" over it; but while a block or piece representing a card of greater value can capture a block representing a card of less value the reverse is not the case. Thus a king can capture a queen, but a queen cannot capture a king. That player is the winner of the game who succeeds first in landing four of his pieces upon the four correspondingly-colored squares of the last row of squares of the board.

Having thus described my invention, what I claim is—

A set of pieces or blocks, consisting of a plurality of blocks formed of rectangular prisms, and each block having card delineations on the front and the rear sides and on the top face thereof, and the delineations portrayed on any single block being identical in value with each other.

Signed by me at New York city, (Manhattan,) New York, this 15th day of January, 1904.

ANDREW GROSS.

Witnesses:
WILLIAM SCHULZ,
FRANK V. BRIESEN.